(12) United States Patent
Herhaus

(10) Patent No.: US 9,551,624 B2
(45) Date of Patent: Jan. 24, 2017

(54) TENSILE FORCE MEASURING DEVICE

(75) Inventor: Jürgen Herhaus, Radevormwald (DE)

(73) Assignee: Honigmann Industrielle Elektronik GmbH, Wuppertal (DE)

( * ) Notice: Subject to any disclaimer, the term of this patent is extended or adjusted under 35 U.S.C. 154(b) by 0 days.

(21) Appl. No.: 14/376,271

(22) PCT Filed: Jul. 4, 2012

(86) PCT No.: PCT/EP2012/002806
§ 371 (c)(1),
(2), (4) Date: Mar. 12, 2015

(87) PCT Pub. No.: WO2013/004375
PCT Pub. Date: Jan. 10, 2013

(65) Prior Publication Data
US 2015/0177085 A1 Jun. 25, 2015

(30) Foreign Application Priority Data
Jul. 4, 2011 (DE) .................. 10 2011 106 383

(51) Int. Cl.
G01N 3/08 (2006.01)
G01L 5/04 (2006.01)
G01L 5/10 (2006.01)
G01L 1/26 (2006.01)

(52) U.S. Cl.
CPC . *G01L 5/04* (2013.01); *G01L 1/26* (2013.01); *G01L 5/102* (2013.01); *G01L 5/107* (2013.01)

(58) Field of Classification Search
CPC ................ G01L 5/04; G01L 5/10; G01N 3/08
USPC .......................................................... 73/826
See application file for complete search history.

(56) References Cited

U.S. PATENT DOCUMENTS

| 3,603,416 A | * | 9/1971 | Spurlin | ................... B65G 39/04 177/1 |
| 3,943,761 A | * | 3/1976 | Shoberg | ................... G01L 5/107 73/862.474 |
| 4,534,228 A | * | 8/1985 | Burbank, Jr. | ............. G01L 5/08 73/862.454 |
| 4,587,852 A | * | 5/1986 | Butler | ..................... B65G 43/02 198/810.04 |
| 5,421,534 A | * | 6/1995 | Arnold | ................. H01F 41/0679 226/42 |

(Continued)

FOREIGN PATENT DOCUMENTS

CH 692007 A5 12/2001
DE 3408497 A1 9/1984
(Continued)

OTHER PUBLICATIONS

English language PCT International Search Report mailed Feb. 21, 2013, received in corresponding PCT Application No. PCT/EP12/02806, 2 pgs.

(Continued)

*Primary Examiner* — Lisa Caputo
*Assistant Examiner* — Octavia Hollington
(74) *Attorney, Agent, or Firm* — Grossman Tucker Perreault & Pfleger, PLLC

(57) ABSTRACT

The invention relates to a device for measuring the tensile force of a long object, in which the sensor (1) and the display unit (6) can be separated from one another and, if that is the case, communicate in a wireless manner.

11 Claims, 4 Drawing Sheets

(56) References Cited

Figure 1:
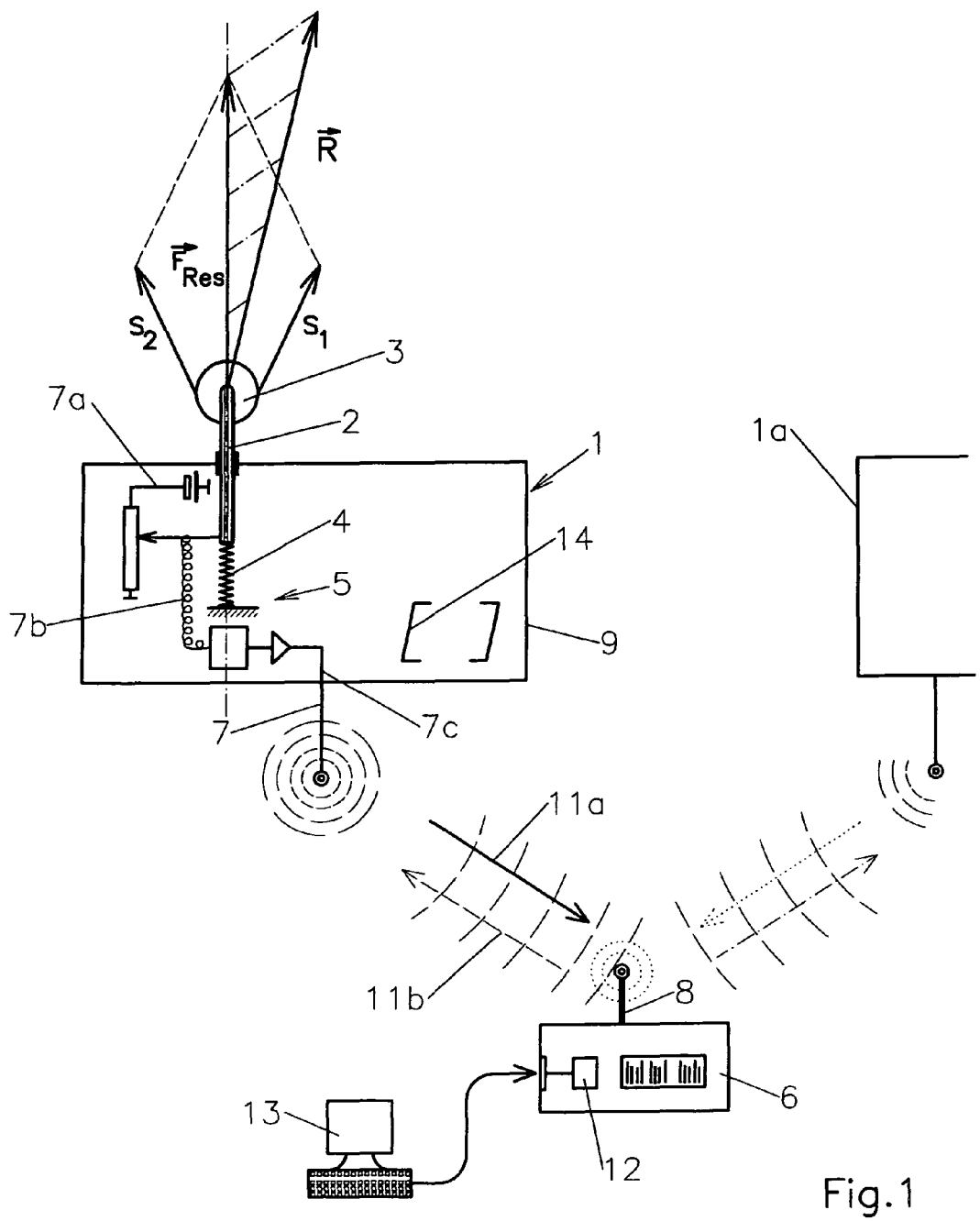

U.S. PATENT DOCUMENTS 9,182,300 B2 * 11/2015 Themm .................. G01L 1/103

FOREIGN PATENT DOCUMENTS

| DE | 3818515 C1 | 10/1989 |
|----|------------|---------|
| DE | 19616194 A1 | 11/1996 |
| DE | 19730965 C1 | 6/1999 |
| DE | 19924738 A1 | 12/2000 |
| EP | 0825426 A1 | 2/1998 |

OTHER PUBLICATIONS

English language PCT Preliminary Report on Patentability/Written Opinion issued Jan. 7, 2014, received in corresponding PCT Application No. PCT/EP12/02806, 8 pgs.

* cited by examiner

TENSILE FORCE MEASURING DEVICE

The present invention relates to a device for measuring the tensile force of a long object according to the generic part of claim 1.

Such a device is generally known.

It consists of a signal transmitter that is connected to a measured value display via an electronic circuit.

On the input side, said signal transmitter is equipped with a measuring transducer which is acted upon by a resultant force of said long object, which is produced by a deflection device fixed to said measuring transducer.

The resultant force on its part acts on a force sensor, which is displaced from its balanced condition to a new balanced condition by said resultant force acting thereon.

The displacement is the measure for the generation of an electrical signal, and the level of the resultant force is inferred from the level of said electrical signal.

This electrical signal must be processed in such a manner that finally the physical value of the tensile force can be read via a display device including an associated display.

In such devices for measuring the tensile force of long objects, in order to obtain reproducible measuring results, the long object is subject to a pre-defined deflection so that the deflection paths and the deflection angles are always the same for all measurements.

Here it is essential that a wrap angle is substantially equally large for all measuring tasks and, needless to say, this wrap angle is to be maintained as far as possible for long objects from different materials and having different dimensions.

In the case of such measuring tasks, the position in a processing line of the long object at which the tensile force is to be measured often is difficult to access.

Frequently, the measurements must be made even under locally difficult or dangerous conditions, in which case it the respective measured variables have to be read off from a display. Examples therefor are among others high line speeds, slippery floors, dangerously high temperatures, hot air streams, poor illumination, or similar conditions.

On the other hand, the manufacturing process may also be susceptible to disturbance or the long object may be breakable or tearable.

To this end, such devices for measuring the tensile force of the long object include display devices that are fixedly mounted to the signal transmitter, partly also in a pivotable manner, even though technical reasons may prevent such display devices from including a display that can be pivoted or adjusted in all directions.

Further, a display that can be read in an easy manner and from different directions also requires a lot of room, which fact may constitute an additional risk potential.

It therefore is an object of the present invention to improve the known device for measuring the tensile force of a long object in such a manner that during the measurement, the user is out of any danger and that the measured value can yet be easily processed for reading.

This object is achieved with the features of the main claim.

An advantage arising from the invention is that the user can fully concentrate on his measuring task without the risk of getting into the processing line when reading the measuring result.

This advantage is achieved by the fact that on the one side, all signal lines that may be subject to the risk of getting caught in the long object exclusively run in a shut-away manner so as to practically exclude any contact with said long object, especially as the latter frequently runs at high processing speeds while the measurement is done, and moreover the signal transmission path between the measuring transducer and the display behind the signal transmitter housing in the signal direction up to the display device including among others also a display, operates in a wireless manner.

The invention nevertheless provides a compact and very handy measuring device that consists of two components that are separate from one another.

Accordingly, it is essential in the present invention that the tensile force in the long object on which the measurement is based and which acts as a resultant force upon a partially wrapped deflection device, is transmitted from signal lines not accessible from outside to a transmission device which is part of the signal transmitter, on the one hand, and from there to a receiving device on said display device.

In principle, the signal transmitter here becomes an F/D converter that transmits a digital signal to the receiving device of the display device in a wireless fashion.

A particular advantage resides in the fact that the display device is either fixed at some place in a stationary and well readable manner or can also be handed out as a mobile component to a further user for reading.

This advantage is achieved by the fact that the signal transmitter that contains the complete mechanical measuring equipment and electronics up to the generation of the display signal, is locally separated from the electronics that finally outputs the signal to be displayed on a display.

Thus the present invention is considerably different from measuring devices known in prior art in which the display unit is separated from the measuring device, because in the present tensile force measuring device the physical value is a force that is directly detected at one position of the signal transmitter by said force acting upon the measuring transducer that is part of the signal transmitter.

The measuring transducer itself is a mechanical component that is mechanically incorporated in the signal transmitter and needs not be connected to the measuring device via measuring lines as in the case of digital multimeters for example, before a signal can be generated at all.

For this reason, the F/D converter configured for wireless communication is particularly important within the scope of the present invention.

The F/D converter can be configured as a compact component of the overall measuring device in such a manner as to enable a practically completely risk-free and yet wirebound transmission of the measured value from the measuring transducer to the evaluation electronics, despite an arrangement of the display device at varying locations.

Moreover, the invention has the advantage that the user can concentrate exclusively on the pick-off of the variable to be measured, namely the tensile force in the long object.

This advantage is the more important, the more difficult the pick-off of the measured variable is.

Particularly in measurements made on a long object in the domain of the paper industry, thanks to the invention, the risk that the measuring device gets caught in the moving paper web and possibly drags along the user no longer exists.

As a result of the invention, the working and operation safety of such a force-measuring device is considerably improved and even affords a one-person operation with only one hand.

It is possible for the user to read the display device with its associated display also personally if he can place the display device in a position favorable for taking the readings, while the user can still stand firmly even at measuring points that are difficult to access.

The features of claim 2 results in a further development in which apart from the sheaves of a complete deflection device and a handle, practically no additional objects are present that might involve the risk of getting caught in the moving long object.

This advantage is achieved by the fact that the signal transmitter, with the exception of the necessary deflection device, includes a fully closed housing with no freely accessible cable connections, not even between the measuring position and the downstream evaluation electronics.

The wireless signal transmission path can be configured as a radio link or optical link.

Advantageously, the display device is directly fixed to the signal transmitter and is detached if necessary so that the measured values can be displayed at a location separate from the signal transmitter.

This can be done using a display device equipped with a belt, a Velcro® strip, a holding magnet or the like, with the aid of which the display device can be fixed to a person's arm, a wall, a metal housing, or can be placed on a table by means of a stand.

The invention further has the advantage that the display device can also be individually addressed for communication with different signal transmitters so as to enable parallel readings or readings in turns.

In such a case, one and the same display device could even be easily used for several signal transmitters, and the signals output from the respective transmitters would not interfere with each other because of this individual addressability.

Further, the signal transmission path can also be operated bi-directionally. This option is particularly useful in a case where a signal transmitter requires calibration or programming.

Further, it can be useful if the display device is equipped with a measured data storage allowing the values acquired during a measuring cycle to be evaluated externally after the termination of the measurement.

This can be done via external hardware connected to the display device by conventional data lines.

Further, both the display device and the signal transmitter can be connected to the Internet via a corresponding IP address thus also enabling remote readings.

In the latter case, the display device would be provided for example by a laptop display screen placed at a different location.

Particularly advantageous is a further development in which only one single display device is provided for several sensors respectively.

This measure has the advantage of low cost together with the possibility of detecting tensile forces of a processing line also at different locations either parallel or in turns.

Figure 2:
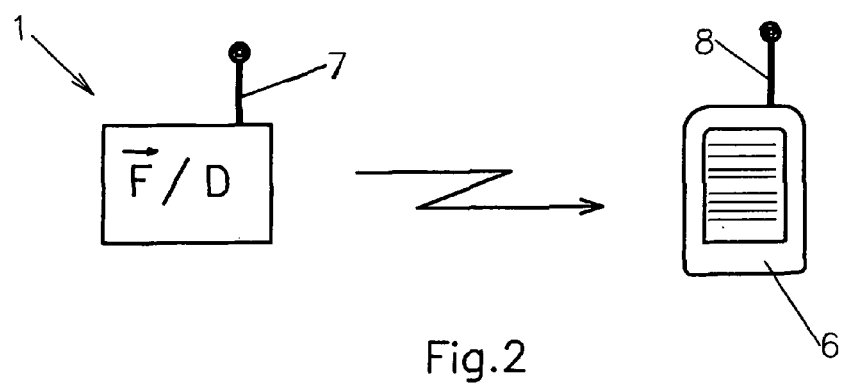
Figure 3:
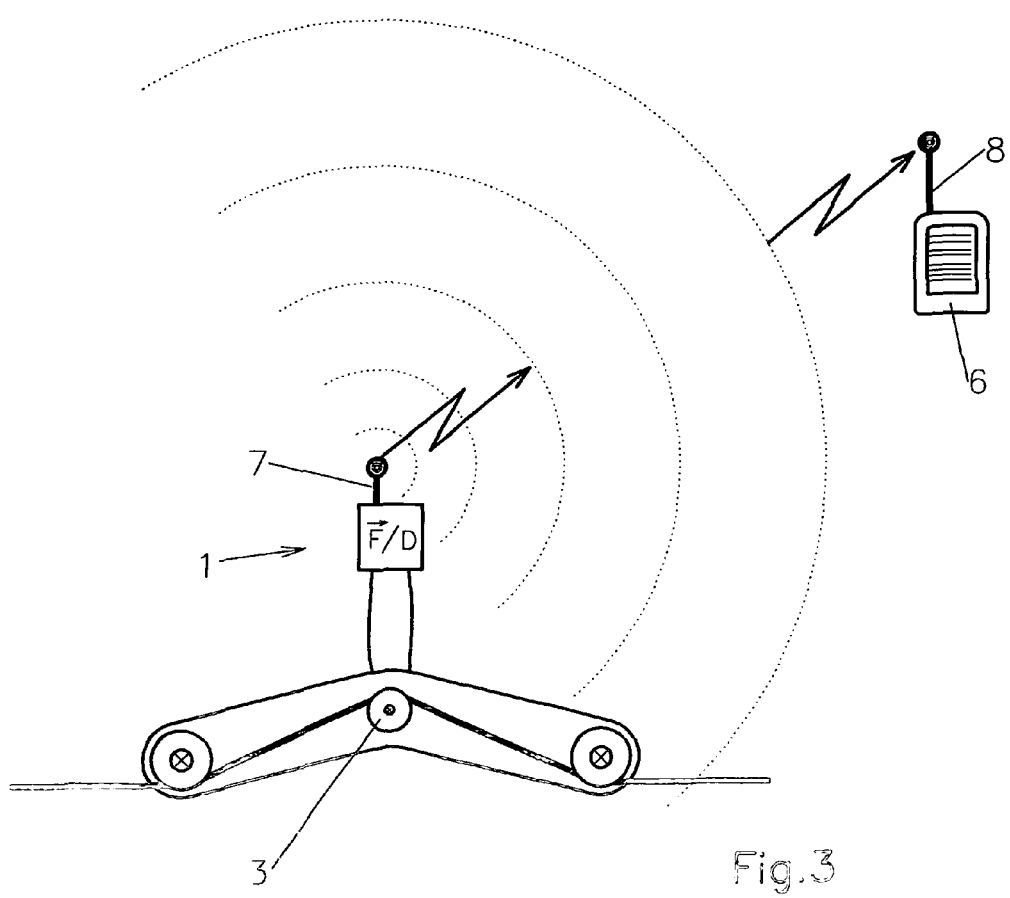
Figure 4:
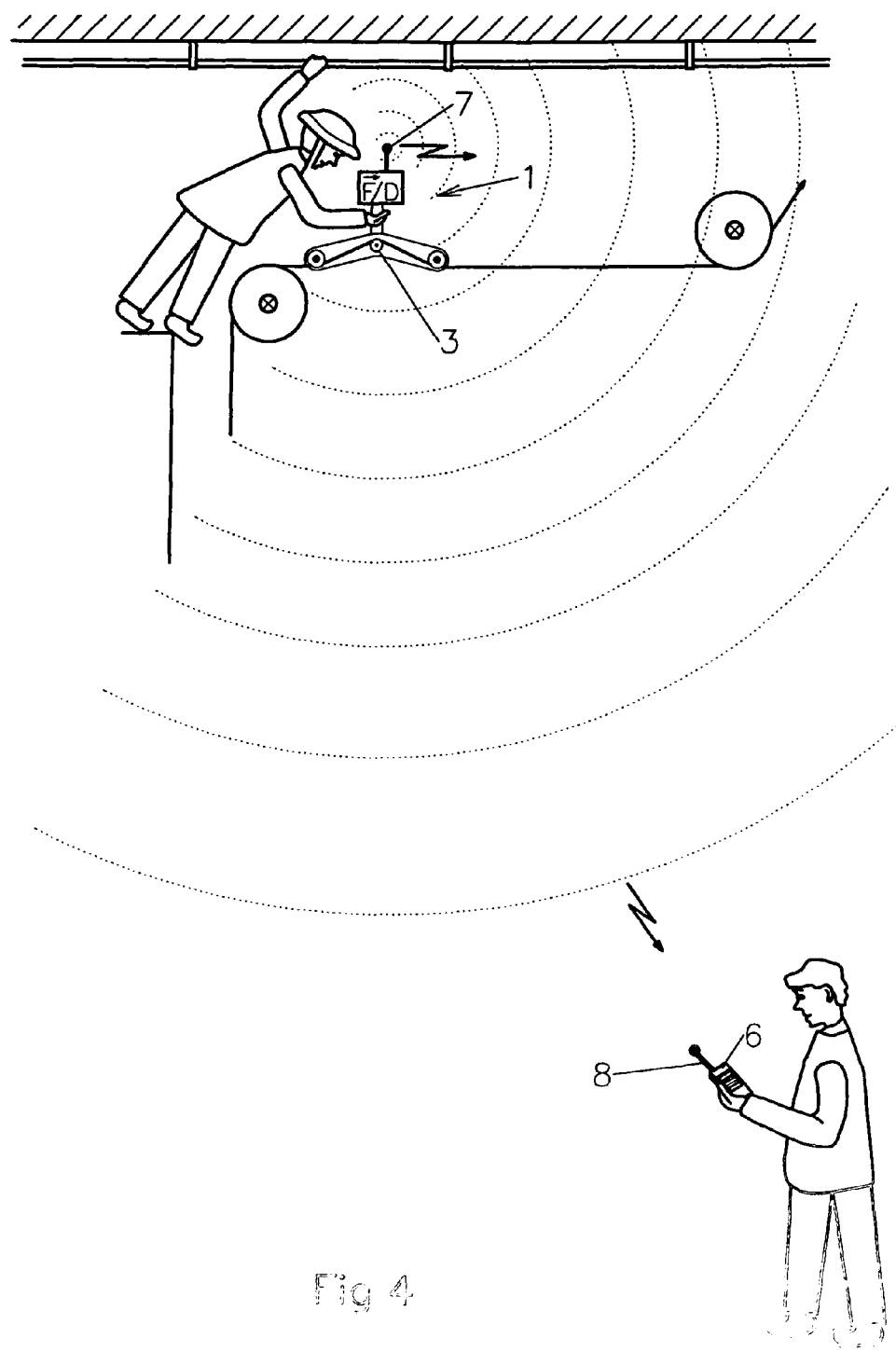
Figure 5:
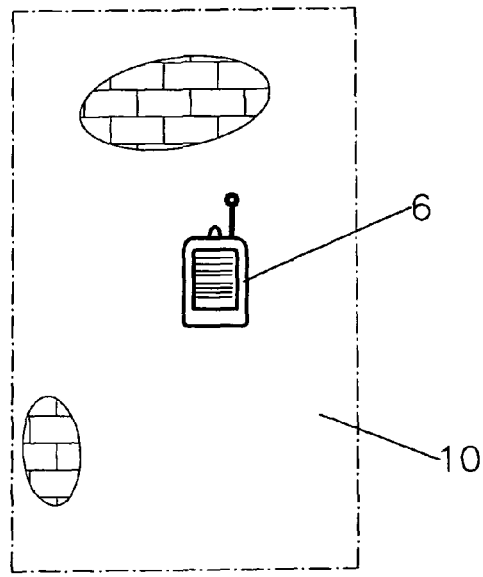

In the following the invention will be described in more detail with reference to the attached drawings wherein it is shown by:

FIG. 1 a first embodiment of the invention;

FIG. 2 the illustration according to FIG. 1 as a schematic view;

FIG. 3 a practical example for use of the invention in a 3-sheave signal transmitter;

FIG. 4 a measurement made on the moving long object under difficult conditions;

FIG. 5, 6, 7 different options of arranging the display device.

The following description generally applies for all the above drawing Figures, unless otherwise noted.

The Figures show a device for measuring the tensile force of a long object.

Said long object is for instance a rope, a belt, or a band.

The long object can be arranged in stationary manner such as a steel rope for example used for stabilizing a construction or can be moving in a production process such as a paper web in the paper industry for example.

Such a device includes a signal transmitter 1.

Signal transmitter 1 is provided on the input side thereof with a measuring transducer 2 carrying a deflection device 3 for the long object.

Said deflection device serves the deflection of said long object so that a force R is produced as a result of said deflection, which force acts upon measuring transducer 2 by its component $F_{res}$ pointing in the direction of its measuring axis, which is represented by a chain line.

For measuring, said long object is partly wrapped about deflection device 3, which on its part acts upon a force sensor 4 by the component of R that points in the measuring direction.

In this context, FIG. 1 shows that a spring is provided as a force sensor 4 whose spring force is kept balanced with the force $F_{res}$ resulting from that partial wrap. As apparent from FIG. 1, said resultant force is obtained by a vector addition of forces S1 and S2 produced as a result of said wrapping about the long object.

From the displacement of force sensor 4, an electrical signal corresponding to the level of the resultant force $F_{res}$ can be produced through an electronic circuit 5, the signal being converted into a display signal for display device 6 through said electronic circuit 5.

Important is that from the measuring transducer 2 up to the display device 6, all signal lines 7a, 7b, and 7c (illustrated in a simplified manner) are shut away to prevent said signal lines from getting caught in the long object, particularly in a moving long object as illustrated in FIG. 4.

Further, it is essential that beside the fact that this signal transmission path is configured in such a manner as to shut away all signal lines vulnerable to getting caught in said long object, additionally a wireless signal transmission path is provided between the signal transmitter 1 and the display device 6.

To this end, a transmission device 7 is disposed on signal transmitter 1 and an associated receiving device 8 is disposed on display device 6.

Said transmission and receiving devices communicate in a wireless manner, which is essential for the invention.

As further shown by the drawing Figures, this device generally is an F/D converter in which the input signal, i.e. the resultant force $F_{res}$ obtained by a vector addition of the long-object forces S1 and S2, is converted into a digital signal D, which is then transmitted to said receiving device 8 via said transmission device 7.

As further shown particularly by FIG. 1, all said signal lines 7a, 7b, 7c required for the conversion of the physical input parameter force F into a digital electronic output parameter D, exclusively run inside a closed housing 9 that is part of signal transmitter 1.

The signal transmission path can be a radio link or can operate via optical transmission waves, as particularly shown by the drawing Figures.

Particularly suitable are techniques according to 2400 to 2483.5 MHZ ISM or SDR standards or Bluetooth-registered or optical systems via IrDA-registered transceivers.

There is preferred an embodiment in which the housing 9 of the signal transmitter comprises a holder 14 to which the display device 6 can be fixed when not in use. In this way, said signal transmitter and display device 6 always stay together while not being in use, and can be easily separated from one another.

Figure 6:
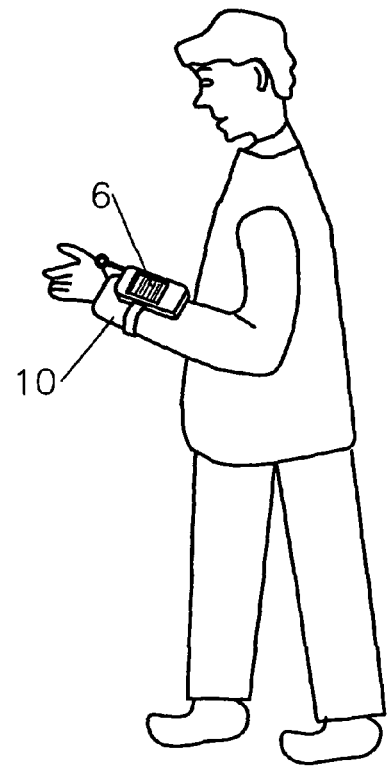
Figure 7:
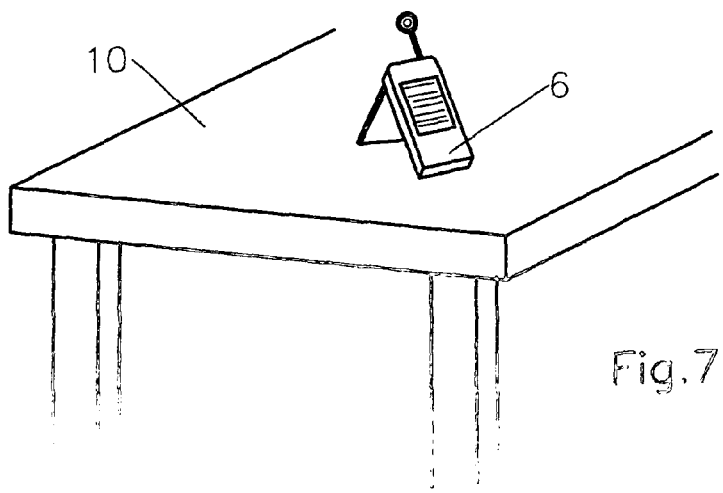

To this end, the FIGS. 5 to 7 show display devices 6 having fasteners 10 with the aid of which said display devices can be fixed for example to a person's arm (see FIG. 6), to a wall (see FIG. 5), to a metal housing (see FIG. 5) or can be disposed on a table for example, via a corresponding stand (see FIG. 7).

FIG. 1 furthers shows an embodiment in which one and the same display device 6 is assigned to different signal transmitters 1 and 1a and can also be individually addressed for that purpose.

In particular, FIG. 1 also shows an embodiment in which the wireless signal transmission path can work from the transmission device 7 to the receiving device 8 and also vice versa, i.e. bi-directionally.

The signal transmission direction 11a, 11b provides an option for the display device 6 to communicate also with the signal transmitter 1, for calibration or programming for example.

In the display device 6 according to FIG. 1, there is additionally provided a measuring data storage 12 in which the measured values obtained during a measurement are to be stored for a possible further evaluation by external hardware 13.

FIG. 2 additionally shows a schematic representation of the invention. In this Figure, there is merely illustrated an F/D converter that communicates with the display device 6 via a corresponding wireless link in such a manner that after their conversion into a digital signal, the measured values picked-up by said F/D converter can be displayed on the display of the display device.

With regard to the present measuring task, which is to provide a preferably reproducible measurement of the tensile force in the long object, FIG. 3 additionally shows a possible embodiment in which the long object is guided over deflection device 3.

The long object is subject to a precisely defined wrapping angle at the central sheave that represents the deflection device 3, because the two deflection sheaves of signal transmitter 1 disposed on the left and right sides are stationary.

Such an arrangement of the deflection sheaves has advantages, which are particularly due to the fact that the conditions for entry, deflection and exit of the long object are always consistent with each other so that the measuring result that is delivered is always comparable.

FIG. 4 additionally shows the use of the invention in a measuring situation where the measuring position is difficult to access.

The user of the signal transmitter 1 here schematically shows that the measuring position is not easily accessible.

If the measuring object is a running belt whose tensile force must be measured, the user can fully concentrate on the detection of the measured value and is not required to make any contorted movements for reading the respective display.

The auxiliary person who firmly stands on the floor holds the display device in its hand.

The data exchange takes place exclusively through wireless communication, which is essential for the invention, while the acquisition of the measured values and their corresponding processing up to the digital output signal of the transmission device takes place through the wires which are provided exclusively inside the housing 9 of signal transmitter 1.

Essential for invention is a mobile measuring device for measuring the tensile force, the device providing the option of a spatial separation of the F/D converter with its deflection device and the display device, while the display device may be additionally implemented also by external hardware that can be disposed away from the house.

LIST OF REFERENCE NUMBERS 1 signal transmitter
1a signal transmitter
2 measuring transducer
3 deflection mechanism
4 force sensor
5 electronic circuit
6 display device
7, 7a, 7b transmission device
7c signal lines
8 receiving device
9 housing
10 fasteners
11a, 11b signal transmission device
12 measured data storage
13 external hardware
14 holder

What is claimed is:

1. A measuring device for measuring the tensile force of a long object including a rope, a belt, or a band comprising:
   a wireless signal transmitter including on an input side thereof a measuring transducer with a deflection device for said long object,
   a wireless display device,
   wherein said deflection device is partially wrapped by said long object for measurement and acting on a force sensor via said measuring transducer, a resultant force $F_{res}$ exerted on the deflection device by said long object being applied to the force sensor, whereby an electrical signal corresponding to the level of the resultant force $F_{res}$ is produced which is converted into a display signal for the wireless display device through an electronic circuit,
   wherein the measuring device is constructed as mobile measuring device comprising two mobile usable components which are separated from one another in use, wherein a first component of the two components is the wireless signal transmitter and a second component of the two components is the wireless display device, and
   wherein a signal transmission path is established from the measuring transducer up to the wireless display device and is configured in such a manner as to shut away all signal lines vulnerable to getting caught in said long object, said signal transmission path additionally being wireless between the wireless signal transmitter and the wireless display device, through a transmission device on the wireless signal transmitter and an associated receiving device of the wireless display device.

2. The measuring device for measuring the tensile force of a long object according to claim 1, wherein all signal lines exclusively run inside a closed housing of the wireless signal transmitter.

3. The measuring device for measuring the tensile force of a long object according to claim 1, wherein said wireless signal transmitter is an F/D converter.

4. The measuring device for measuring the tensile force of a long object according to claim 1, wherein said wireless signal transmission path is a radio link.

5. The measuring device for measuring the tensile force of a long object according to claim 1, wherein said wireless signal transmission path is configured for optical transmission waves.

6. The measuring device for measuring the tensile force of a long object according to claim 1, wherein said wireless display device, concerning its mounting, is connectable to said wireless signal transmitter in a detachable manner.

7. The measuring device for measuring the tensile force of a long object according to claim 1, wherein said wireless display device comprises fasteners for fastening to a body.

8. The measuring device for measuring the tensile force of a long object according to claim 1, wherein said wireless display device is individually addressable, for communication with different wireless signal transmitters.

9. The measuring device for measuring the tensile force of a long object according to claim 1, wherein said wireless signal transmission path is operable bi-directionally.

10. The measuring device for measuring the tensile force of a long object according to claim 1, further comprising a data storage for measurement data.

11. The measuring device for measuring the tensile force of a long object according to claim 1, wherein the signal of the transmission device is readable via external hardware.

* * * * *